S. DOUTHIT.
LOCK NUT.
APPLICATION FILED JUNE 10, 1916.

1,220,207.

Patented Mar. 27, 1917.

WITNESSES
Howard F. Costello
Wm H. Mulligan

INVENTOR
Samuel Douthit
BY
ATTORNEY

UNITED STATES PATENT OFFICE.

SAMUEL DOUTHIT, OF CENTRALIA, ILLINOIS.

LOCK-NUT.

1,220,207.  Specification of Letters Patent.  Patented Mar. 27, 1917.

Application filed June 10, 1916. Serial No. 102,971.

*To all whom it may concern:*

Be it known that I, SAMUEL DOUTHIT, a citizen of the United States, residing at Centralia, in the county of Marion and State of Illinois, have invented certain new and useful Improvements in Lock-Nuts, of which the following is a specification.

This invention relates to a lock nut and more particularly to a nut adapted to be mounted upon a threaded shank of a bolt in the usual manner and which will be provided with means adapted to allow the nut to be freely threaded upon the bolt but designed to contact with the threads of the bolt for preventing the nut from being conveniently removed from the bolt.

A further object of this invention is the provision of a lock nut which consists of comparatively few parts and is simple in construction, but durable and well adapted to withstand the rough usage to which devices of this character are ordinarily subjected.

Figure 1:
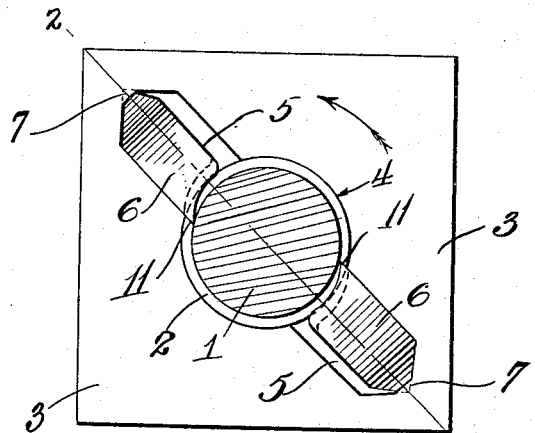

For a full description of the invention and the advantages and merits thereof, reference is to be had to the following description and the accompanying drawings, wherein is illustrated the preferred form of my invention, in which, Figure 1 is a plan view.

Figure 2:
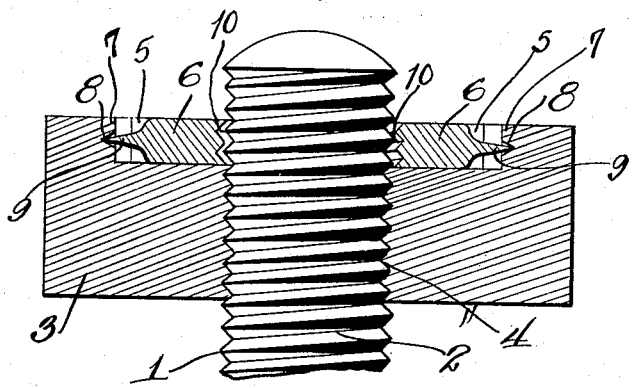

Fig. 2 is a vertical section on the line 2—2 of Fig. 1.

The bolt is provided with the usual shank 1 having screw threads 2 formed thereon for receiving the nut 3. The nut 3 is provided with the usual central opening 4 having interior screw threads adapted to register with the screw threads 2 of the bolt.

One face of the nut 3 is provided with oppositely disposed diagonally extending recesses 5 which are extended into the nut for a depth sufficient to receive the locking latches 6. It will be observed that the recesses 5 communicate with the central opening 4 of the nut and the outer ends of the recesses are of substantially V-shape. The vertex of the V-shaped end of each recess is provided with a fillet 7 for providing material into which the depression 8 may be formed for receiving the pointed end 9 of the locking latches 6.

Figure 3:

Particular attention is directed to the construction and shape of the locking latches, one of which is mounted in each of the recesses 5. Each latch 6 consists of a substantially rectangular block having a pointed end 9 which is adapted to fit in the depression 8. The opposite end of each of the locking latches is provided with serrations 10 adapted to register with the threads 2 of the bolt and, as shown by Figs. 1 and 3, the arch of the threads or serrations 10 is struck from a point which causes one end edge of each of the latches to be in contact with the threads of the shank of the bolt, as at 11, and this edge acts as a biting-jaw which is adapted to bite into the shank of the bolt when an attempt is made to unscrew the nut from the bolt.

It will be noted that the angular formation of the end of each of the locking latches is such as permits each of the locking latches to extend into the V-shaped end of one of the recesses 5 and, as the angle of the end of each latch is more acute than the angle of the V-shaped end of the recesses, the locking latch is permitted to swing to one side of the recess which is of a greater width than the locking latch. The end 9 of each locking latch acts as a pivot point upon which the locking latch is swung and, it will be noted from this construction, when the nut is rotated in the direction indicated by the arrow, the point of the edge 11 will bite into the shank of the bolt and prevent the rotation of the nut.

The locking latches will be retained in their proper places irrespective of the position of the nut and bolt since, the point 9 extending into the depression 8 together with the serrations 10 engaging the threads of the bolt, provide a means for retaining the locking latches within the recesses without other retaining elements being necessary.

From the foregoing it will be observed that a very simple and durable locking nut has been provided, the details of which embody the preferred form. I desire it to be understood however, that slight changes or modifications in the minor details of construction may be made without departing from the spirit of the invention or the scope of the claims hereunto appended.

I claim:

1. The combination with a bolt having a screw threaded shank and a nut for the bolt, the said nut having one face provided with recesses of V-shaped formation extending radially in opposite directions from and communicating with the central opening in the nut, a fillet formed in the vertex of each of the said depressions, latches disposed in the said recesses and means formed on the latches and adapted to be associated with the said fillets for retaining the latches within the said recesses, the said latches also being provided with serrations for engaging the said screw threaded shank.

2. The combination with a bolt having a screw threaded shank and a nut for the bolt having a screw threaded central opening, said nut also provided with recesses in one face thereof, the outer ends of said recesses being of V-shaped formation whereby the side walls of said recess join together at the V-shaped ends, a fillet formed in the vertex of each of said V-shaped ends, said fillet being provided with a depression, latches arranged in said recesses and tapered at one end to provide a point to extend into the depression of said fillet, the opposite end of said latches having serrations for engaging the threads of said shank.

3. The combination with a bolt having a screw threaded shank and a nut for the bolt having a screw threaded central aperture, said nut provided with recesses in one face thereof and extending diagonally across the nut and communicating with said central opening, the outer ends of said recesses terminating adjacent the corners of said nut and being V-shaped whereby the side walls of said recesses are joined together at the ends of the recesses, the vertex of each of said V-shaped ends having a fillet in each of which a depression is formed, and a pair of latches arranged one in each recess, said latches being of the width less than the width of said recess and terminating in a point adapted to fit in the depressions of said fillet, one side of the pointed end of each latch being spaced away from the side walls of the V-shaped end of the recess and the opposite ends of the latches provided with a sharp edge for engaging the threads of said shank.

4. The combination with a bolt having a screw threaded shank and a nut for the bolt having a screw threaded central opening, said nut also provided with recesses in one face thereof, the said recesses communicating with the central opening and being of V-shaped formation at their ends, latches mounted in said depressions, said latches being tapered at one end, the angle of said tapered end of said latches being more acute than the angle of the V-shaped ends of said latches and the width of the latches being less than the width of said recesses whereby the latch will be free to move from engagement with one wall of said recess to the opposite wall of said recess, a fillet formed in the vertex of each of said V-shaped ends and having a depression formed therein for receiving the point of the tapered end of one of the latches, the opposite ends of said latches engaging the threads of said bolt.

In testimony whereof I affix my signature in presence of two witnesses.

SAMUEL DOUTHIT.

Witnesses:
ISAAC ANDERECK,
HELENE KANEY.

Copies of this patent may be obtained for five cents each, by addressing the "Commissioner of Patents, Washington, D. C."